US011873934B2

(12) United States Patent
Durieux et al.

(10) Patent No.: US 11,873,934 B2
(45) Date of Patent: Jan. 16, 2024

(54) QUICK COUPLING AND CONNECTION ASSEMBLY COMPRISING SUCH A QUICK COUPLING

(71) Applicant: STAUBLI FAVERGES, Faverges-Seythenex (FR)

(72) Inventors: Christophe Durieux, Gilly sur Isere (FR); Serafim Marques Barroca, Albertville (FR)

(73) Assignee: STAUBLI FAVERGES, Faverges-Seythenex (FR)

( * ) Notice: Subject to any disclaimer, the term of this patent is extended or adjusted under 35 U.S.C. 154(b) by 0 days.

(21) Appl. No.: 17/965,741

(22) Filed: Oct. 13, 2022

(65) Prior Publication Data

US 2023/0250909 A1 Aug. 10, 2023

(30) Foreign Application Priority Data

Oct. 13, 2021 (FR) ...................................... 2110833

(51) Int. Cl.
*F16L 37/34* (2006.01)
*F16L 37/098* (2006.01)
*F16L 37/35* (2006.01)

(52) U.S. Cl.
CPC ............. *F16L 37/34* (2013.01); *F16L 37/098* (2013.01); *F16L 37/35* (2013.01)

(58) Field of Classification Search
CPC . F16L 37/34; F16L 37/35; F16L 29/04; F16L 37/1225; F16L 37/0885
See application file for complete search history.

(56) References Cited

U.S. PATENT DOCUMENTS 2,319,015 A * 5/1943 Speth ...................... F16L 29/04
137/614.03
4,886,301 A * 12/1989 Remsburg ............... F16L 37/56
285/39

(Continued)

FOREIGN PATENT DOCUMENTS

| EP | 2818781 A1 | 12/2014 |
| FR | 3084437 A1 | 1/2020 |
| SE | 2050441 A1 | 4/2020 |

OTHER PUBLICATIONS

Search Report for FR Application No. 2110833, dated Apr. 26, 2022.

*Primary Examiner* — David Colon-Morales
(74) *Attorney, Agent, or Firm* — MARSHALL, GERSTEIN & BORUN LLP

(57) ABSTRACT

A quick coupling (2) includes a male element and a female element, each with a male or female tubular body, a distal mouth and a movable shutter or a plunger and a spool. A first seal is partially housed in the male tubular body and rests radially on a cylindrical surface of the movable shutter in an advanced position. A second seal rests radially on a cylindrical wall of the plunger. The first seal includes a front surface which is further advanced than a first edge plane along a longitudinal axis of the male tubular body. The second seal includes a front surface which is further advanced than a second edge plane along a longitudinal axis of the female tubular body. The first and second front surfaces contact each other when the male and female elements are fitted together.

18 Claims, 9 Drawing Sheets

(56) References Cited

U.S. PATENT DOCUMENTS

| | | | | |
|---|---|---|---|---|
| 4,991,627 A * | 2/1991 | Nix | ............... | F16D 48/02 |
| | | | | 285/319 |
| 5,215,122 A * | 6/1993 | Rogers | ............... | F16L 37/34 |
| | | | | 251/149.6 |
| 5,398,723 A * | 3/1995 | Allread | ............... | F16L 37/34 |
| | | | | 137/614.04 |
| 5,494,073 A * | 2/1996 | Saito | ............... | F16L 37/34 |
| | | | | 251/149.6 |
| 5,709,243 A * | 1/1998 | Wells | ............... | F16L 37/34 |
| | | | | 137/614.01 |
| 5,911,403 A * | 6/1999 | deCler | ............... | B67D 7/0294 |
| | | | | 251/149.6 |
| 7,469,472 B2 * | 12/2008 | deCler | ............... | F16L 37/34 |
| | | | | 285/285.1 |
| 7,661,724 B2 * | 2/2010 | Arosio | ............... | F16L 19/005 |
| | | | | 285/86 |
| 7,708,029 B2 * | 5/2010 | Kitagawa | ............... | F16L 37/34 |
| | | | | 251/149.6 |
| 8,028,718 B2 * | 10/2011 | Tiberghien | ............... | F16L 29/04 |
| | | | | 251/149.6 |
| 8,201,853 B2 * | 6/2012 | Tiberghien | ............... | F16L 37/248 |
| | | | | 285/376 |
| 9,709,199 B2 * | 7/2017 | Laufer | ............... | F16L 29/04 |
| 9,903,520 B2 * | 2/2018 | Gennasio | ............... | F16L 37/32 |
| 10,190,713 B2 * | 1/2019 | Tiberghien | ............... | F16L 37/32 |
| 10,288,198 B2 * | 5/2019 | Tiberghien | ............... | H05K 7/20272 |
| 10,781,957 B2 * | 9/2020 | Tiberghien | ............... | F16L 37/30 |
| 11,098,831 B2 * | 8/2021 | Tiberghien | ............... | F16L 29/04 |
| 11,486,528 B2 * | 11/2022 | Nick | ............... | F16L 37/23 |
| 11,619,334 B2 * | 4/2023 | Langer | ............... | F16L 37/34 |
| | | | | 285/66 |
| 11,635,162 B2 * | 4/2023 | Martin | ............... | F16L 37/0841 |
| | | | | 285/317 |
| 2013/0312846 A1 * | 11/2013 | Eriksen | ............... | H05K 7/20772 |
| | | | | 137/315.01 |
| 2019/0093809 A1 * | 3/2019 | Wada | ............... | F16L 37/36 |
| 2020/0284387 A1 * | 9/2020 | Wall | ............... | F16L 37/32 |

* cited by examiner

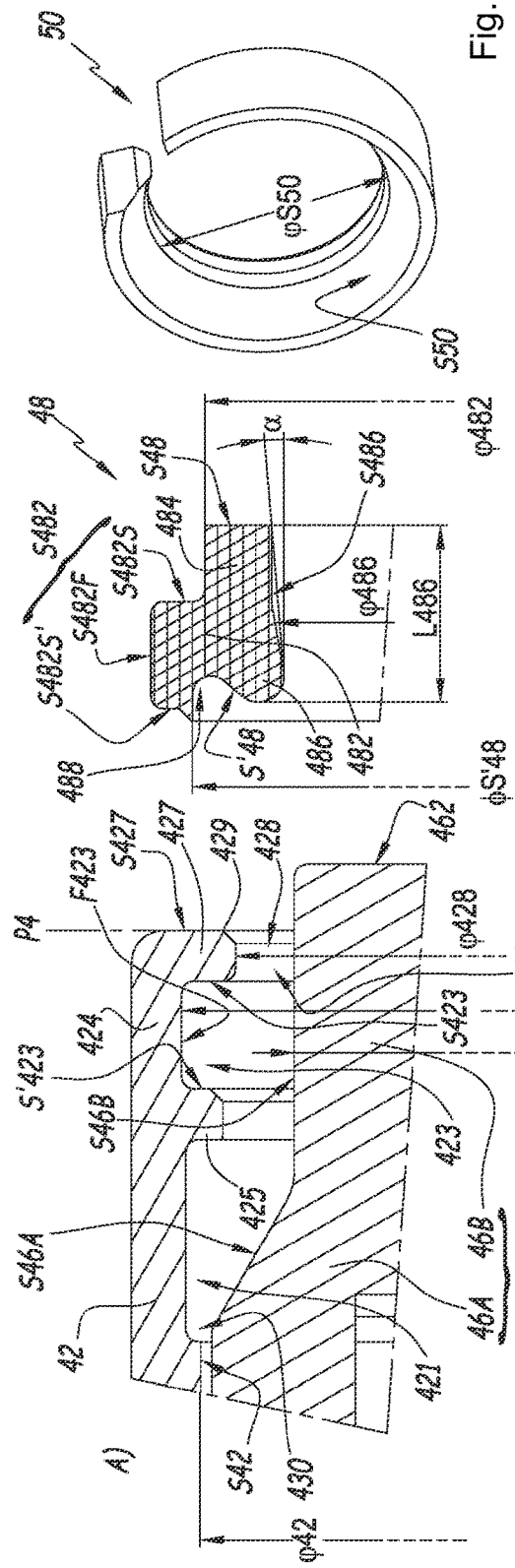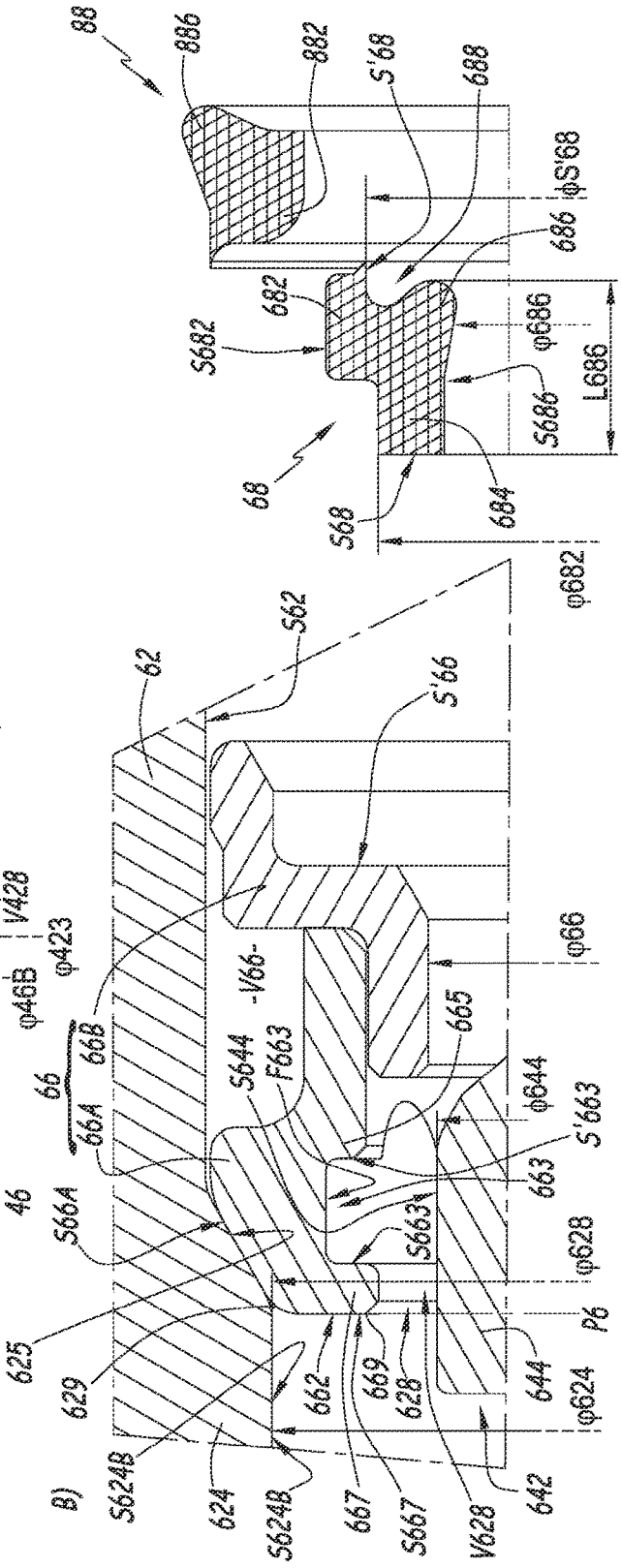
Fig. 2A
Fig. 2B

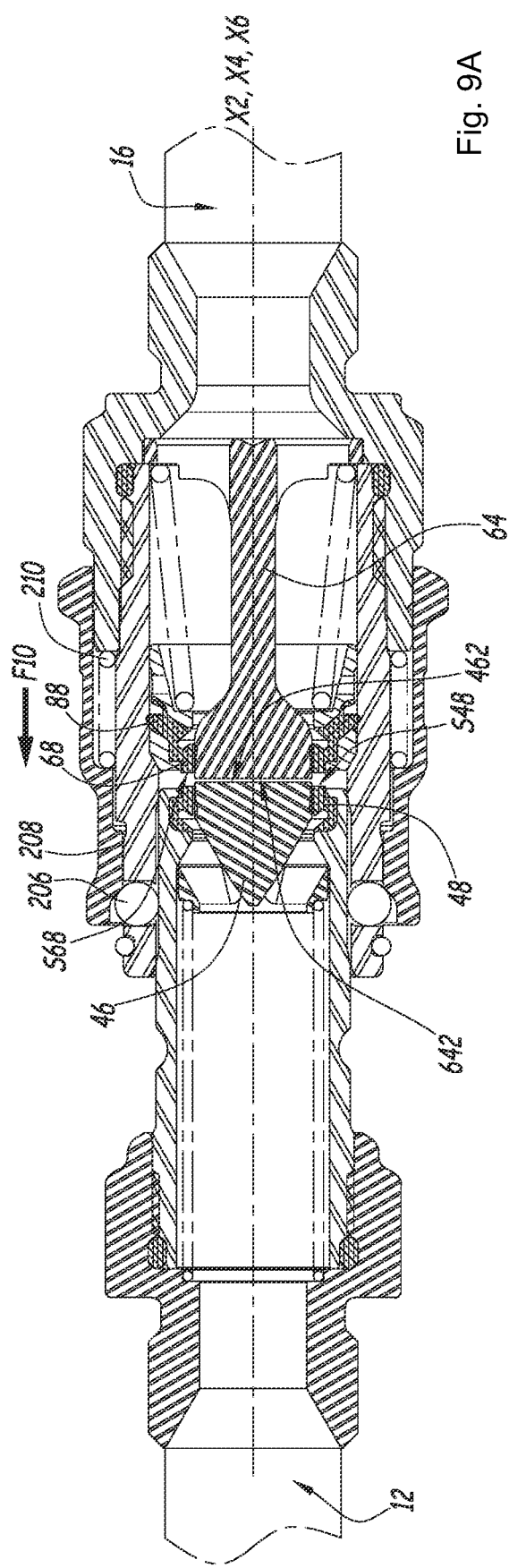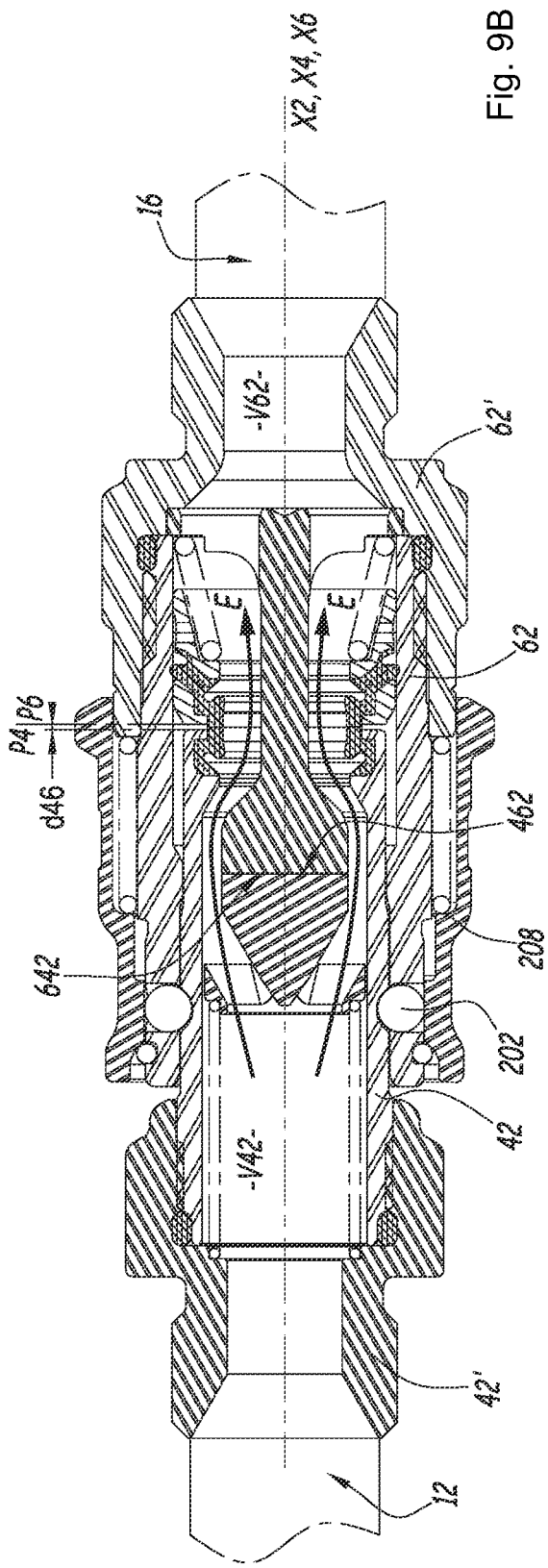

QUICK COUPLING AND CONNECTION ASSEMBLY COMPRISING SUCH A QUICK COUPLING

FIELD

The present invention concerns a quick coupling for the detachable connection of two pipes through which a pressurised fluid flows.

The field of the invention is that of fluidic connections. In this field, it is known to use a quick coupling comprising a male element and a female element each connected to a pipe and capable of fitting into each other.

BACKGROUND

FR-A-3084437 teaches to provide seals at the interface between a shutter and a tubular body of a male fitting and/or at the interface between a spool and a plunger or tubular body of the female fitting of the same fitting.

It is also known from EP-A-2818781 that an O-ring is mounted on a shutter of a male coupling element, which O-ring bears against a seat, while a seal mounted on a spool of the female element bears against a rear seat of a plunger in the advanced position of this spool.

These quick couplings are generally satisfactory.

However, there is a risk that spaces between moving parts of the male and female parts may fill with fluid when the quick coupling is coupled or disconnected, especially at the front of the male and female parts. This may cause dripping at the end of the disconnection. Such dripping phenomena, which result in particular from dimensional variations in the constituent parts of the quick coupling due to the manufacturing tolerances of these parts, are prohibitive for certain applications, in particular in the food and electronic sectors. They also contribute to the possible pollution of the connection's environment, which then needs to be decontaminated regularly.

SUMMARY

These problems are particularly addressed by the invention, which proposes a new quick coupling for the detachable connection of two pipes through which a pressurised fluid flows and in which the risks of dripping are minimised.

To this end, the invention relates to a quick coupling for the detachable connection of two pipes through which a pressurised fluid flows, this quick coupling comprising a male element and a female element capable of fitting together along an insertion axis, between an uncoupled configuration and a coupled configuration of the quick coupling. The male element comprises a male tubular body which extends along a first longitudinal axis between a proximal end and a distal end and which has a first longitudinal cavity for the passage of pressurised fluid in the coupled configuration of the quick coupling,
- a first edge plane formed on the outside of the distal end of the male tubular body and perpendicular to the first longitudinal axis;
- a first distal mouth defined by the distal end of the male tubular body and having a diameter smaller than a diameter of the first longitudinal cavity;
- a shutter that is movable along the first longitudinal axis between an advanced position, where it closes the first distal mouth, and a retracted position, where it does not close the first distal mouth;
- a first seal.

The female element comprises a female tubular body which extends along a second longitudinal axis between a proximal end and a distal end and which comprises a second longitudinal cavity for the passage of pressurised fluid in the coupled configuration of the quick coupling,
- a second distal mouth, a diameter of which is smaller than a diameter of the second longitudinal cavity;
- a plunger capable of pushing the movable shutter from its advanced position to its retracted position along the first longitudinal axis;
- a spool mounted around the plunger, movable along the second longitudinal axis between an advanced position, where it closes the second distal mouth, and a retracted position, where it does not close the second distal mouth, and which has a second edge plane, formed on the outside of a distal end of the spool and perpendicular to the second longitudinal axis;
- a second seal which is partially housed in a groove in the spool and which rests on a wall of the plunger when the spool is in the advanced position. In accordance with the invention, the first seal is partially housed in a groove in the male tubular body and rests on a cylindrical surface of the movable shutter, in a direction radial to the first longitudinal axis, when this movable shutter is in the advanced position; when the spool is in the advanced position, the second seal rests on a cylindrical wall of the plunger in a direction radial to the second longitudinal axis; the first seal comprises a first front surface which is more advanced than the first edge plane along the first longitudinal axis; the second seal comprises a second front surface which is more advanced than the second edge plane along the second longitudinal axis; and the first and second front surfaces of the first and second seals are adapted to contact each other when the male and female elements of the quick coupling are pushed together.

The invention ensures that the first and second front surfaces of the first and second seals come into contact first when the male and female parts of the quick coupling are coupled and separate last when they are uncoupled. The first and second seals thus ensure a permanent sealing function, in particular around the front faces of the male and female elements of the quick coupling, even taking into account possible dimensional variations in the components of the couplings.

According to advantageous but not mandatory aspects of the invention, such a quick coupling may incorporate one or more of the following features, taken in any combination that is technically feasible: when the shutter is in the advanced position, the first seal occupies an annular volume defined, radially to the first longitudinal axis, between the male tubular body and the shutter and, axially along the first longitudinal axis, in front of the groove of the male tubular body and behind the first edge plane and/or when the spool is in the advanced position, the second seal occupies an annular volume defined, radially to the second longitudinal axis, between the plunger and the distal end of the spool and, axially along the second longitudinal axis, in front of the groove of the spool and behind the second edge plane; the shutter has a front face turned away from the first cavity and arranged axially along the first longitudinal axis in front of the first front surface in the advanced position of the shutter and/or the plunger has a front face turned away from the second cavity and arranged axially along the second longitudinal axis in front of the second front surface in the advanced position of the spool; the first seal comprises a first locking bead for hooking in the groove of the male tubular body, this first bead being delimited by a first contact surface with the groove of the male tubular body, a first internal surface designed to bear against the cylindrical wall of the shutter and a bulge whose unstressed diameter is smaller than an external diameter of the shutter and which is delimited by the first internal surface; and/or the second seal comprises a second locking bead for hooking in the groove of the spool, this second bead being delimited by a second contact surface with this groove of the spool, a second internal surface designed to rest against the cylindrical wall of the plunger and a bulge whose unstressed diameter is less than a diameter;

- the first seal comprises a first rear surface which faces the first longitudinal cavity, which connects the first contact surface with the first inner surface and which is concave and/or the second seal comprises a second rear surface which faces the second longitudinal cavity, which connects the second contact surface with the second inner surface and which is concave;
- the first rear surface delimits a first groove which is open to the first longitudinal cavity in the advanced position of the shutter and whose maximum diameter is greater than a minimum diameter of the first contact surface and/or the second rear surface delimits a second groove which is open to the second longitudinal cavity in the advanced position of the shutter and whose maximum diameter is greater than a minimum diameter of the second contact surface;
- behind the groove, the male tubular body has an internal diameter greater than a maximum diameter of the first rear surface;
- the male element comprises a ring fitted into the male tubular body, configured to form a seat for supporting the shutter in the advanced position, and an internal diameter of which is less than a maximum diameter of the first rear surface; —the male element comprises a first resilient biasing member configured to bias the shutter into the advanced position and the female element comprises a second resilient biasing member configured to bias the spool into the advanced position;
- the spool is formed by a front part, which comprises the groove where the second seal is partially housed, and a rear part attached to the front part, which comprises a proximal bearing surface for the second resilient biasing member and whose internal diameter is smaller than a minimum diameter of the second contact surface;
- the spool carries a third seal in contact with the female tubular body in the forward and reverse positions of the spool;
- in the coupled configuration of the quick coupling, the first front surface is in axial contact, parallel to the insertion axis, with the second front surface;
- when the shutter is in the advanced position, the first front surface is located along the first longitudinal axis between the first edge plane and a first plane parallel to the first edge plane, perpendicular to the first longitudinal axis and passing through the front face of the shutter, and when the shutter is in the advanced position, the first edge plane and the first parallel plane are separated by a distance of less than or equal to 1 mm along this axis and/or when the spool is in the advanced position the second front surface is located along the second longitudinal axis X6 between the second edge plane and a second plane parallel to the first edge plane, perpendicular to the second longitudinal axis and passing through the front face of the plunger, and when the plunger is in the advanced position, the second edge plane and the second parallel plane are separated by a distance of less than or equal to 1 mm along this axis;
- in the coupled configuration of the quick coupling, the plunger holds the shutter in the retracted position, the pressurised fluid is free to flow between the first and second longitudinal cavities, and the distal end of the male tubular body and a front face of the spool are spaced apart along the insertion axis by a non-zero distance;
- the first seal and the second seal are identical;
- the female element comprises at least two bearing surfaces centred on the second longitudinal axis, the bearing surfaces are configured to guide the male element during insertion and the bearing surfaces have a common guide diameter and are offset along the second longitudinal axis by a distance greater than or equal to one fifth of the common guide diameter.

According to another aspect, the invention relates to a connection assembly of a mobile connection plate to at least one fixed connection plate, in particular for connecting hydraulic type circuits. In accordance with the invention,

- the connection assembly comprises at least one quick coupling according to one of the preceding claims;
- the male element of the quick coupling and the female element of the quick coupling are each mounted on one of the movable and fixed plates, which has a channel running through it that is fluidly connected to the first or second longitudinal cavity of the coupling element; and
- a first plate, of the movable plate and the fixed plate, is equipped with a clamp for retaining the male or female element mounted on this first plate, this retaining clamp allowing a movement of the male or female element with respect to the first plate, in a plane normal to the first or second longitudinal axis of the male or female element mounted on this first plate.

The advantages of this connection assembly are similar to those of the quick coupling of the invention.

BRIEF DESCRIPTION OF THE DRAWINGS

The invention will be better understood and advantages beyond this one will emerge more clearly in light of the following description of three embodiments of a quick coupling and two embodiments of a connection assembly using its principle, given solely by way of example and made with reference to the accompanying drawings, in which:

FIG. 2A is a larger-scale view of details A and B in FIG. 1, in which seals are shown outside the fitting elements to which they belong;

FIG. 2B is a split ring, also outside the fitting element to which it belongs, in perspective and on a smaller scale;

FIGS. 9A and 9B show, in a longitudinal cross-section similar to FIG. 8, two steps involved in coupling the male and female elements of the quick coupling of FIG. 8.

DESCRIPTION

Figure 1:
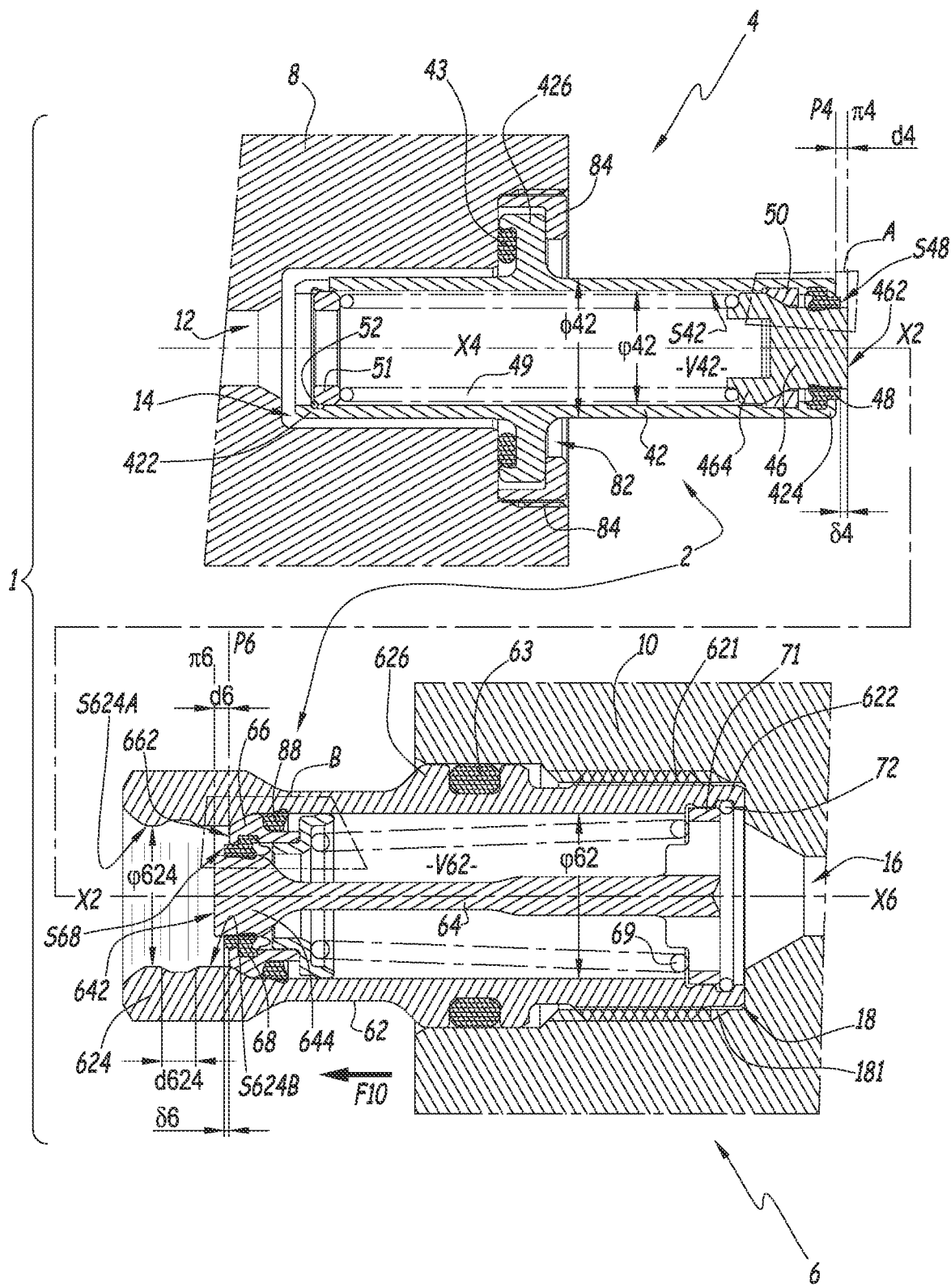
FIG. 1 is a principle longitudinal cross-section of a connection assembly according to the invention, including a quick coupling according to the invention, in uncoupled configuration.
Figure 3A:
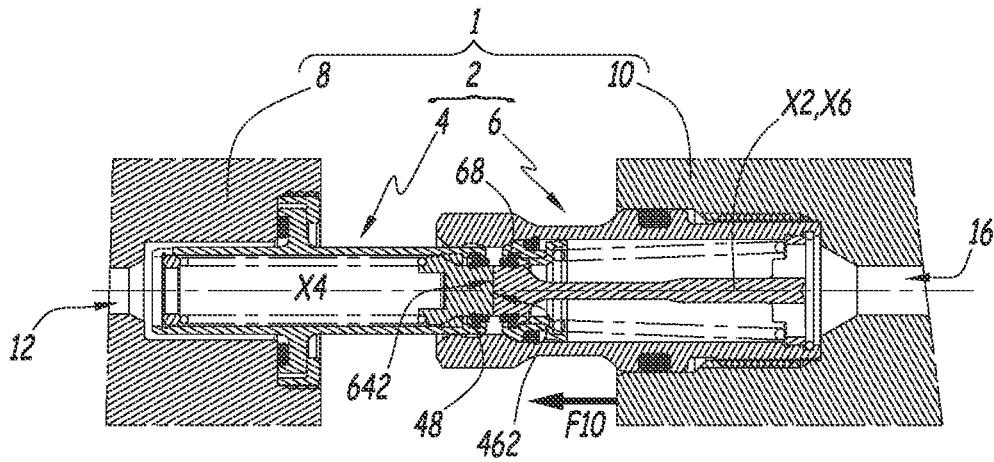
FIGS. 3A, 3B and 3C show, in a longitudinal cross-section similar to FIG. 1 but on a smaller scale, three steps involved in coupling the male and female elements of the quick coupling of FIGS. 1, 2A and 2B.
Figure 3B:
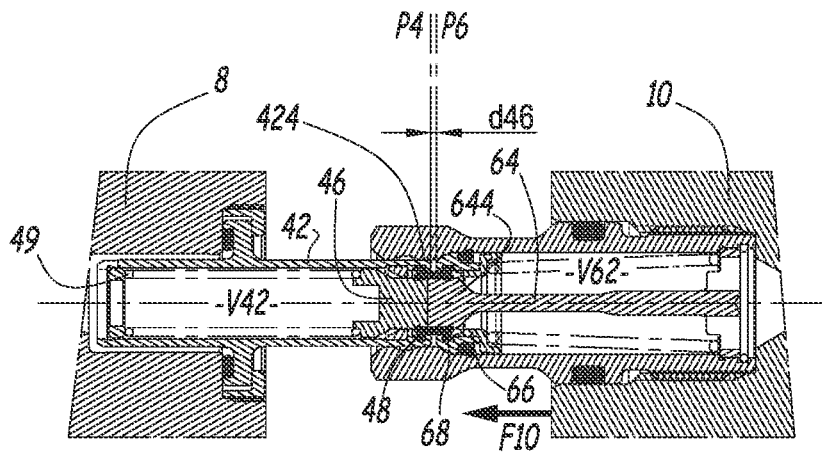
Figure 3C:
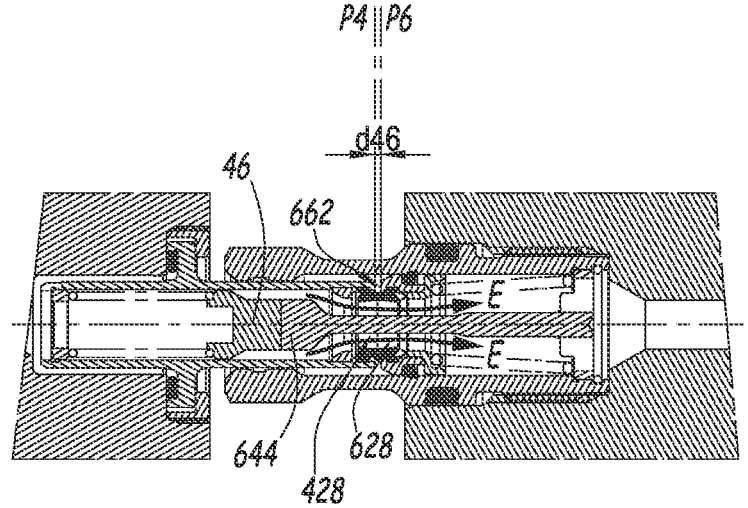

The connection assembly 1 shown in FIGS. 1 to 3 comprises a quick coupling 2 which comprises a male element 4 and a female element 6 adapted to fit together along a insertion axis X2 of the quick coupling 2.

The male element 4 is mounted on a connection plate 8, which is shown in part and on which several other male or female coupling elements may, in practice, be mounted, not shown.

Similarly, the female element 6 is mounted on a connection plate 10, which is shown in part and on which a number of other male or female coupling elements may be mounted, not shown.

The connection plate 10 is movable, in the sense that it can be brought closer to the fixed connection plate 8, via a translational movement represented by the arrow F10 and generally parallel to the insertion axis X2, for the coupling of the elements 4 and 6, i.e. the closing of the quick coupling 2. When the quick coupling 2 is opened, the movable connection plate 10 is moved away from the fixed connection plate 8 in the opposite direction to the arrow F10.

The connection plates 8 and 10 and the coupling 2 belong to the connection assembly 1, as well as any other coupling elements mounted on these connection plates.

The fixed connection plate 8 has a channel 12 passing through it which opens into a bore 14 in which a proximal or rear part of the male element 4 is mounted. Comparably, the movable connection plate 10 has a channel 16 passing through it which opens into a bore 18 in which a proximal or rear part of the female element 6 is mounted.

In this respect, for each coupling element 4 or 6, a distinction is made between its proximal or rear side, located on the side of the pipe 12 or 14 to which it is connected, and its distal or front side, facing its complementary element, i.e. the other element of the quick coupling 2, just before coupling or during coupling. These notions of proximal or rear side, on the one hand, and distal or front side, on the other hand, also apply to the component parts of elements 4 and 6 and are oriented in the same direction.

The male element 4 comprises a tubular male body 42 which extends along a longitudinal axis X4 of the male element 4, between a proximal or rear end 422 and a distal or front end 424. The proximal end 422 is open and positioned opposite the opening of the pipe 12 into the bore 14.

The male tubular body 42 further comprises an annular flange 426 which surrounds a tubular portion of the body 42 and extends outward, radially to the longitudinal axis X4, away from each of the ends 422 and 424 along the longitudinal axis X4. Between the flange 426 and the end 424, the tubular body 422 is cylindrical with a constant circular cross-section, with an outer diameter 042 and an inner diameter 942, smaller than the diameter 042 of twice the thickness of the male tubular body 42. S42 is the radial inner surface of the male tubular body, which is of diameter 942.

The flange 426 is arranged in a counterbore 82 of the connector plate 8 which surrounds the distal mouth of the bore 14 and which is of a diameter strictly greater than that of the flange 426. A seal 43 is interposed between a rear face of the flange 426 and the bottom of the counterbore 82. On the other hand, a threaded clamp 84 is screwed into an internal thread 86 of the counterbore 82 and has an L-shaped cross-section which enables it to retain the flange 426 axially along the axis X4 in the counterbore 82.

Means not shown, such as a key or the like, are used to secure the clamp 84 against rotation relative to the connection plate 8.

The clamp 84 provides radial translation space for the flange 426 to improve the positioning of the X2 axis relative to the X6 axis. Thus, the positioning of the male tubular body 42 can be adjusted relative to the connection plate 8 according to a movement in a plane radial to the longitudinal axis X4. This allows the male element 4 and female element 6 to be aligned during coupling or uncoupling, with the axes X4 and X6 coinciding.

The distal end 424 of the male tubular body 42 is closed by a shutter 46 which is translatable within the male tubular body 42 along the longitudinal axis X4 between an advanced position and a retracted position. In its advanced position, the shutter 46 closes a distal mouth 428 of the male element 4, which is defined by the distal end 424 and whose diameter is noted as 9428.

The diameter 9428 is strictly less than the inner diameter 942 of the portion of the male tubular body 42 that extends between the flange 426 and the distal end 424.

Opposite the mouth 428 with respect to the shutter 46, the male tubular body 42 defines an internal volume V42, which is cylindrical with a circular cross-section of diameter 942 and centred on the axis X4 and which constitutes a first longitudinal cavity for the passage of pressurised fluid, in the mated configuration of the quick coupling 2.

On an inner face of its distal end 424, the male tubular body 42 has an internal peripheral groove 423. This groove 423 is defined, along the longitudinal axis X4, between an internal rib 425 of the distal end 424 and an annular wall 427 which constricts the distal end 424 at the mouth 428. The volume V42 is defined along the longitudinal axis X4 behind the groove 423.

S427 is the front surface of rib 427, which is opposite the groove 423 and the volume V42.

The cylindrical bottom surface of the groove 423, which is a radial inner surface of the distal end 424, is denoted F423 and its diameter as 9423. S423 is the annular surface of the front edge of the groove 423, which in practice is the rear surface of the annular wall 427, perpendicular to the longitudinal axis X4. S'423 is the annular surface of the rear edge of the groove 423, which in practice is the front surface of the rib 425, also perpendicular to the longitudinal axis X4.

The shutter 46 comprises a central frustoconical portion 46A which defines a frustoconical outer surface S46A centred on the axis X4 and converging towards the front, and a front portion 46B which defines a circular cylindrical outer surface S46B. The front portion 46B is located, along the longitudinal axis X4, between the intermediate portion 46A and a front face 462 of the shutter 46. This front face 462 is also a front face of the male element 4 as it projects forwardly from the annular wall 427 along the axis X4 in the closed configuration of the male element when the shutter 46 closes the front end 424 of the male tubular body 42.

On the other hand, the shutter 46 is equipped with two rear lugs 464 which extend the intermediate part towards the rear and allow it to be guided in translation on the internal radial surface S42 of the male tubular body 42, in the volume V42.

V428 is the annular volume defined, radially to the longitudinal axis X4, between the annular wall 427 and the surface S46B, around the shutter 46, at the mouth 428.

The diameter of the surface S46B is denoted by 946B. In the example of FIGS. (to 3, this diameter 946B is 3.45 mm (millimetres), the diameter 9428 is 4.5 mm and the diameter 9423 is 5.3 mm.

The front outer radial edge of the mouth 428, i.e. the inner radial edge of the surface S427, is denoted 429. In other words, the edge 429 delimits the junction between a front face of male tubular body 42, defined by the surface S427, and a radial inner surface of the rib 427, which surrounds the mouth 428 and the volume V428.

P4 is an edge plane of the male element 4, defined as a plane radial to the longitudinal axis X4 and passing through the edge 429. The edge plane P4 includes the surface S427.

A first seal 48 is mounted in the groove 423 and extends around the cylindrical front part 46B of the movable shutter 46, when the shutter is in its advanced position, as seen in FIGS. 1 and 3.

The cross-section of the seal 48 is solid and constant around the axis X4.

In FIG. 2, the seal 48 is shown on the outside of the male tubular body 42 which shows its unstressed geometry, i.e. when it is not compressed between the elements 42 and 46.

A split ring 50 is also mounted within the distal end 424, and around the movable shutter 46. In FIG. 2, this split ring is shown in perspective outside the male tubular body 42 to explain its geometry. This split ring is provided with a frustoconical surface S50 complementary to the surface S46A, which comes to rest against this surface S50 in the advanced position of the shutter 46, when it closes the distal end 424. In other words, the split ring 50 forms a seat for receiving the shutter 46 when it closes the mouth 428.

The diameter of the surface S50 is denoted 9550.

The split ring 50 is received in a radially inner groove 421 of the male tubular body 42, this groove 421 being axially delimited, along the axis X4, between the rib 425 and a shoulder 430. When the ring 50 is in the mounted configuration in the groove 421, the frustoconical surface S50 converges towards the axis X4, in the direction of the edge plane P4.

The seal 48 comprises a bead 482 for hooking into the groove 423, a central portion 484 and a bulge 486 disposed, with respect to the central portion and radially to the axis X4 in the mounted configuration of the seal 48 in the groove 423, opposite the bead 482. In the unstressed configuration of the seal 48, the bulge 486 has an internal diameter 9486 whose minimum value is strictly less than the diameter 946B of the surface S46B. The bulge 486 forms a radial protrusion, or peripheral hump, on the inner side of the seal 48, similar to a seal lip.

The outer surface S482 of the bead 482 is complementary to the surface defined in the groove 423. Specifically, the surface S482 comprises a first portion S482F complementary to surface F423, a second portion S482S complementary to the surface S423 and a third portion S482S' complementary to the surface S'423.

In this way, the seal 48 can be held firmly in place in the groove 423 by form-fitting or even by slightly compressing the bead 482 into the groove 423.

The diameter of the surface S482 is denoted 9482. In this example, this minimum diameter 9482 is measured on the side of the second portion S482S.

The seal 48 also comprises a front surface S48, facing the front of the male element 4 when the seal 48 is mounted in the male tubular body, and a rear surface S'48 facing away from the front surface S48 towards the rear of the male element 4, i.e. towards the side of the split ring 50 and the volume V42. The front surface S48 may also be referred to as the front or distal surface of the seal 48.

The seal 48 further comprises an inner radial surface S486 which defines the bulge 486 opposite the intermediate portion 484 and whose length L486 measured parallel to the axis X4 is 1.5 mm in the example of the figures. The bulge 486 forms a hump, i.e. a lip with a curved profile, for support against the shutter 46.

In practice, the internal diameter 9486 of the seal 48 is the diameter of the surface S486 and has a variable value along the surface S486, between a maximum value, in the vicinity of the front surface S48, and a minimum value, at the bulge 486 when the bulge 486 is not stressed.

The rear surface S'48 connects surfaces S482 and S486 on the rear of the seal 48 and defines a groove 488 open to volume V42, i.e. to the rear. The maximum diameter of the rear surface S'48, which is equal to the maximum diameter of the groove 488, is denoted OS'48. The diameter 942 is larger than the diameter OS'48. The diameter 9S50 is smaller than the diameter OS'48. The diameter OS'48 is larger than the minimum diameter 9482 of the surface S482.

In the advanced configuration of the movable shutter 46, the radially inner surface S486 of the seal 48 is in abutment with the surface S46B of the shutter 46, along a direction radial to the axis X4, as seen in FIG. 1. The geometry of the inner radial surface S486 then matches the geometry of the outer radial surface S46B which is made of a harder material than the seal 48. For simplicity, this adaptation of the S486 surface is not shown in FIGS. 1 and 3, where the seal is shown in its unstressed configuration.

As seen in FIGS. 1 and 3, the front surface S48 projects forwardly from the distal end 424 of the male tubular body 42 at the mouth 428. In other words, the front surface S48 is further advanced than the first edge plane P4 along the axis X4.

The offset along the longitudinal axis X4 between the plane P4 and the front surface S48 is denoted Z4. As explained above, the value of this offset is non-zero.

Advantageously, for a quick coupling whose diameter 942 has a value between 3 and (2 mm, the value of this axial offset Z4 is between 0.3 and 0.7 mm, preferably between 0.4 and 0.6 mm, more preferably of the order of 0.5 mm.

When the shutter 46 is in the advanced configuration, the front surface S48 is set back along the longitudinal axis X4 from the front face 462 of the shutter 46. A plane parallel to the first edge plane P4, and thus perpendicular to the longitudinal axis X4, and containing the front face 4-2 is denoted rr4. In the advanced configuration of the shutter 4-, the front surface S4-8 is located, along the longitudinal axis X-, between the planes P4 and rr4. The distance, measured parallel to the axis X4, between the planes P4 and rr4, when the shutter 46 is in the advanced position, is denoted d4.

Advantageously, for a quick coupling with a diameter 942 of between 3 and (2 mm, the distance d4 is less than or equal to 1 mm.

The seal 48 occupies volume V428.

The male element 4 also comprises a member 49 for resiliently biasing the shutter 46 to its advanced position. This resilient biasing member 49 is arranged in volume V42 and, in this example, consists of a spiral spring which extends along the longitudinal axis X4 and which is supported on the lugs 464 and on a stop ring 51 held in the male tubular body 42, near the proximal end 422, by a resilient snap ring 52.

The female element 6 comprises a tubular female body 62 which extends along a longitudinal axis X6 of the female element 6, between a proximal or rear end 622 and a distal or front end 624. The proximal end 622 is open and positioned opposite the opening of the pipe 16 into the bore 18.

The female tubular body further comprises an annular overlay 626, or outer flange, with a peripheral and outer groove in which an O-ring 63 is received. The overlay 626 is configured to be positioned within an enlarged mouth of the bore 18, with the seal 63 abutting the peripheral surface of that bore. On the other hand, the female tubular body 62 is provided with an external thread 621 which cooperates with an internal thread 181 of the bore 18, so that the female tubular body 62 is screwed into the bore 18 in the vicinity of the proximal end 622. The longitudinal axis X6 is thus fixed in relation to the connection plate 10 and aligned with the insertion axis X2.

The distal end 624 of the female tubular body 62 is formed by a flared portion of the body 62, the internal diameter of which is stepped and greater than or equal to the diameter X42. The radially inner surface of the distal end 624 comprises two bearing surfaces S624A and S624B which are offset from each other along the axis X6 and have the same inner diameter 9624, which is equal to the diameter X42. These bearing surfaces S624A and S624B are used to guide the front portion of the male tubular body 42 projecting from the connection plate 8, in particular the distal end 424 of this tubular body, when the male and female elements 4 and 6 are pushed together, when coupling or uncoupling.

The distance, measured parallel to the longitudinal axis X6, between the bearing surfaces S624A and S624B is d624. In order to ensure effective guiding of the male element 4 into the female element 6, the ratio d624/9624 is chosen to be greater than '0.2, preferably about 0.25.

Behind the two bearing surfaces S624A and S624B, the female tubular body houses a plunger 64 which extends along the longitudinal axis X6 between the distal end 624 and a base 71 attached to the female tubular body 62 in the vicinity of its proximal end 622, by means of a resilient snap ring 72. At its distal end, the plunger 64 has a head 644 which has a front face 642, in the shape of a disc centred on the longitudinal axis X6, and an external cylindrical peripheral surface S644, also centred on this axis. Advantageously, the front face 642 has the same cross-section as the front face 462.

The plunger 64 is capable of pushing the movable shutter 46 from its advanced position to its retracted position along the longitudinal axis X4.

The female tubular body 62 has, in the vicinity of its distal end 624, a frustoconical internal surface 625, centred on the axis X6 and converging towards the bearing surfaces S624A and S624B. A joining edge between surfaces S624B and 625 is denoted 629.

A distal mouth 628 of the female element 6 is intended to be closed by the head 644 associated with a spool 66 which can be moved in translation within the female tubular body 66, along the longitudinal axis X6, between an advanced position in which it blocks the mouth 628 of the female element 6 and a retracted or rear position in which it does not block that second mouth.

The diameter of the mouth 628 is denoted 9628.

The inside diameter of the portion of the tubular body 62 that extends between the head 644 of the plunger 64 and the proximal end 622 is denoted 962. This portion defines an internal volume V62 of the female tubular body 62, which is cylindrical with a circular cross-section, of diameter 962 and centred on the axis X6 and which constitutes a second longitudinal cavity for the passage of pressurised fluid, in the coupled configuration of the quick coupling 2.

The diameter 9628 is strictly smaller than the diameter 962.

The spool 62 is formed by two annular parts 66A and 66B nested within each other and which constitute a front part and a rear part of the spool 66 respectively.

In this case, the front and rear parts of the shutter are fitted together. Alternatively, other methods can be used to fit the front and rear parts together, for example screwing or crimping.

The front part 66A of the spool 66 defines a frustoconical surface S66A converging forward in the direction of axis X6 and of complementary geometry to that of surface 625. The surface 625 thus constitutes a support seat for the spool 66 in its advanced position.

The front part 66A comprises, on its inner side facing the head 644, an inner peripheral groove 663 of comparable shape to groove 423 and of which F663 is the bottom, S663 a front edge surface and S'663 a rear edge surface.

The groove 663 is defined, along the longitudinal axis X6, between an internal shoulder 665 of the shutter 66 and an annular wall 667 which constricts the front part of the shutter 66 at the mouth 628. The annular wall 667 forms part of the distal end of the spool 66 which defines the front face 662 of the spool 66. In particular, the front surface S667 of the rib 667, which is opposite the groove 663 and the volume V62, forms part of the front face 662.

The inner edge of surface S667, which forms the front radial edge of the mouth 628, is denoted 669. In other words, the edge 669 defines the junction between the front face 662 of spool 66 and a radially inner surface of rib 667, which surrounds mouth 628. This radially inner surface of the rib 667 also surrounds a volume V628 defined, analogously to volume V428, as an annular volume which extends, radially to the longitudinal axis X6, between the annular wall 667 and the radially outer surface S644 of the head 644, around the plunger 64, at the mouth 628, when the spool 66 is in the advanced position.

P6 is an edge plane of the female element 6, defined as a plane radial to the longitudinal axis X6 and passing through the edge 669. The edge plane P6 includes the surface 662 and S667.

Advantageously, the edge plane P6 passes through the edge 629 when the spool is in the advanced position.

The front part 66A defines, on the other hand, a volume V66 which is annular in shape and open towards the rear, radially outwards in relation to the axis X6.

A second seal 68 is mounted in groove 663 and extends into the front portion 66A of spool 66. When the spool is in the advanced position, the seal 68 also extends around the surface S644 of the plunger 64 head 644, as seen in FIG. 1 and in the top and middle portions of FIG. 3. In this position, the seal 68 rests on the wall S644 in a direction radial to the axis X6.

In FIG. 2, the seal 68 is depicted on the outside of the female tubular body 62 to show its unstressed geometry, i.e. when it is not compressed between the elements 62 and 66.

The cross-section of the seal 68 is solid and constant around the axis X6. It occupies volume V628.

Advantageously, the cross-sections of the end walls S48 and S68 are close or similar to make contact with each other when the coupling elements of the quick coupling 2 are pushed together and, preferably, in the coupled configuration of the quick coupling.

Advantageously, the seal 68 is in this embodiment identical to the seal 48.

The seal 68 comprises a bead 682 for hooking in the groove 663, a central portion 684 and a bulge 686 disposed, with respect to the central portion and radially to the longitudinal axis X6, opposite the bead 682. In the unstressed configuration of the seal 68, the bulge 686 has an internal diameter 9686 whose minimum value is strictly less than the diameter 0644 of the surface S644. The bulge 686 forms a radial protrusion, or peripheral hump, on the inner side of the seal 68, similar to a seal lip.

The outer surface S682 of the bead 682 is complementary to the surface defined in the groove 663. As with seal 43, surface S682 comprises a first portion complementary to surface F663, a second portion complementary to surface S663 and a third portion complementary to surface S'663. Thus, like the seal 48, the seal 68 can be held firmly in place in the groove 663. The diameter of the surface S682 is denoted 9682. In this example, this minimum diameter 9682 is measured on the side of the second portion S682.

The seal 68 also comprises a front surface S68, facing the front of the female element 6 when the seal 68 is mounted in the spool 66, and a rear surface S'68 facing away from the front surface S68 towards the rear of the female element 6, i.e. towards the side of the volume V62. The front surface S68 may be referred to as the front or distal surface of the seal 68.

The seal 68 further defines an inner radial surface S686 which defines the bulge 686 opposite the intermediate portion 684. When the seal surrounds the head 644, the geometry of the inner radial surface S686 then matches the geometry of the outer radial surface S644 which is made of a harder material than the seal 68. For simplicity's sake, this adaptation of the surface S686 is not shown in FIGS. 1 and 3, where the seal is shown in its unstressed configuration.

The length L686 of the surface S686 is the same as the length L486.

In practice, the internal diameter 9686 of the seal 68 is the diameter of the surface S686 and has a variable value along the surface S686, between a maximum value, in the vicinity of the front surface S68, and a minimum value, at the bulge 686 when the bulge 486 is not stressed.

The rear surface S'68 connects surfaces S682 and S686 on the rear of the seal 68 and defines a groove 688 open to volume V62, i.e. to the rear. The maximum diameter of the rear surface S'68, which is equal to the maximum diameter of the groove 688, is denoted 9S'68. The diameter 9S'68 is larger than the minimum diameter 9682 of the surface S682.

The front surface S68 is further advanced than the edge plane P6 along the longitudinal axis X6, along the axis X6. In other words, the front surface S68 projects forward from the distal end of the spool 66 along the axis X6.

Thus, the edge plane P6 is set back from the front surface S68 of the seal 68, just as the edge plane P4 is set back from the front wall S48 of the seal 48.

The offset along the longitudinal axis X6 between the plane P6 and the front surface S68 is denoted 66. As explained above, the value of this offset is non-zero.

Advantageously, for a quick coupling whose diameter 942 has a value between 3 and (2 mm, the value of this axial offset 66 is between 0. (and (mm, preferably between 0.1 and 0.5 mm, more preferably on the order of 0.2 mm"

When the spool 66 is in the advanced configuration, the front surface S68 is set back along the longitudinal axis X6 from the front face 642 of the plunger 64. A plane parallel to the second edge plane P6, and thus perpendicular to the longitudinal axis X6, and containing the front face 642 is denoted rr6. In the advanced configuration of the spool 66, the front surface S68 is located, along the longitudinal axis X6, between the planes P6 and rr6. The distance, measured parallel to the axis X6, between the planes P6 and rr6, when the shutter 46 is in the advanced position, is denoted d6.

The annular walls 427 and 667 cooperate with the surfaces S482S and equivalent to provide forward restraint of the seals 48 and 68 and to prevent forward movement of those seals.

The spool 66 carries a third seal 88, which is mounted in volume V66 and which is in permanent abutment against the radial inner surface S62 of the female tubular body 62 in volume V62. This seal 88 comprises a bead 882 complementary to the front part 66A, at the volume V66, and a bulge 886 which is in permanent abutment against the surface S62. This seal 88 can be described as a peripheral seal as it provides peripheral sealing, more specifically permanent peripheral sealing, on the outside of the spool 66.

The adjective "permanent" is used here to mean that contact between the seal 88 and the surface S62 is present in all positions of the seal relative to the female tubular body 62 along the axis X6.

A resilient member 69 exerts a resilient biasing force on the shutter 66 towards its advanced position of closing the mouth 628. This resilient member is preferably formed by a spiral spring which extends along the axis X6, around the plunger 64 and which rests on a proximal surface S'66 of the rear part 66B of the spool 66 and on the base 7(.

The minimum inside diameter of the rear part 66B of the spool 66 is denoted 966. This minimum diameter 966 is smaller than the minimum diameter 9682 of the surface S682. In this aspect of the invention, the spool 66 may have narrow walls, while being provided with a proximal bearing surface suitable for the resilient member 69 to apply a forward force while remaining compatible with the method of manufacture of the seal 48 referred to below.

In the advanced position of the spool 66 shown in FIG. 1, the spool 66 rests against the seat formed by the surface 625 and the seal 68 is in radial sealing contact with the head 644, while the seal 88 forms a peripheral sealing barrier with the internal surface S62.

In the retracted position of the spool shown in the lower part of FIG. 3, i.e. when the male and female elements 4 and 6 are coupled, the seal 68 is no longer in contact with the head 644, so that a fluid stream is formed in the female element, radially inside the spool 66, which is represented by the flow arrows E The seals 48, 68 and 88 are obtained by overmoulding an elastomer, in particular a synthetic or natural rubber, onto a metal part 48 or 66A. The nature of the elastomer allows for a combination of elasticity, adhesion, sealing, and compression fatigue properties that are generally satisfactory.

Figure 4A:
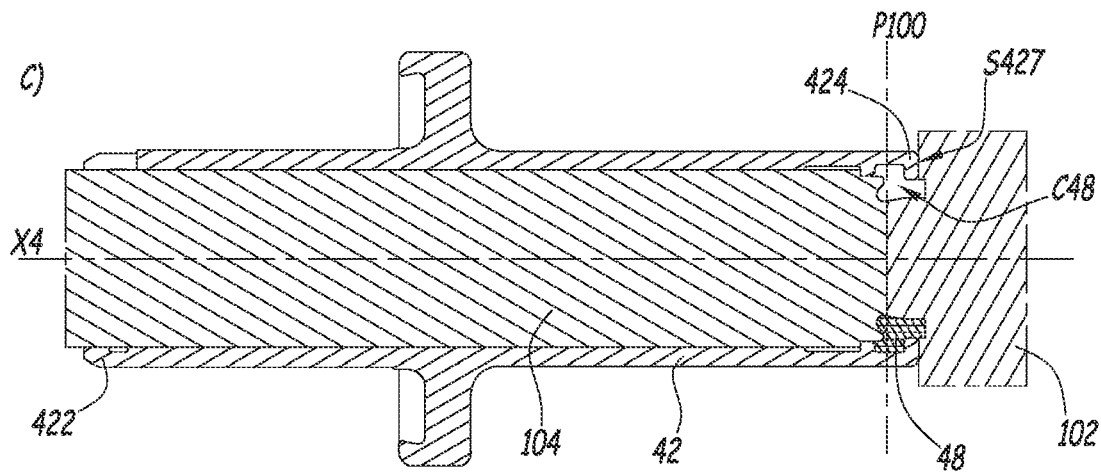
FIGS. 4A and 4B show, on two inserts C and D, steps for the manufacture of the seals of the male and female elements of the quick coupling of FIGS. 1, 2A, 2B, 3A, 3B and 3C.
Figure 4B:
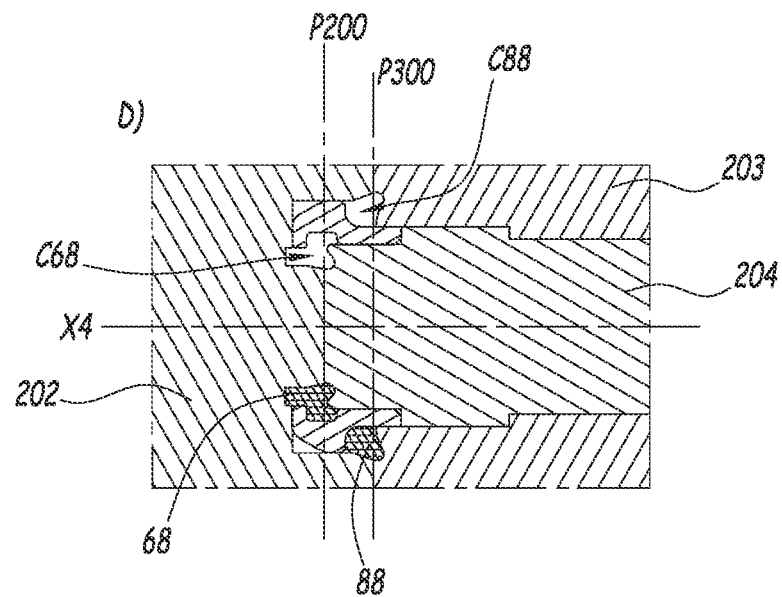

FIG. 4 shows a way of making the seals 48, 68 and 88 by overmoulding, respectively on the body 42 and on the shutter 66, more particularly on its front part 66A. Inset C represents the manufacture of seal 48, while inset D represents the manufacture of seals 68 and 88. On each of these insets, the upper part shows the situation before injection of the material to form the joints, while the lower part shows the moulded joints. Channels, used to guide the injection material to mould cavities of the seals, are not shown.

A front tool 102 and a rear spindle 104 are used to make the seal 48. The front tool is arranged to rest against the surface S427 of the annular wall 427 and the rear spindle 104 is engaged in the male tubular body 42 through its proximal end 422 until it comes into contact with the front tool 102 along a first seal plane P100 which is located in a zone corresponding to the part of the smallest diameter of the surface S486, i.e. at the level of the bulge 486, in order to respect the internal clearance of the seal 48 created by the bulge 486 and which has an angle a of between 5 and (0°. The use of the rear spindle is possible due to the fact that the diameter 942 is larger than the diameter OS'48.

The overmoulding of the seals 68 and 88 is carried out by means of a front tool 202, a rear ring 203 and a rear spindle 204 which define cavities C68 and C88 between them. A seal line P200 is defined between parts 202 and 204, in the same location on the seal 68 as the line P100 on the seal 48, which is also compatible with the clearance of the seal 68 due to the presence of the bulge 686. A further seal line P300 is defined between parts 202 and 203 at cavity C88.

More specifically, the seal 48 is overmoulded on the male tubular body 42 within a cavity C48 defined between parts 42, 102 and 104, while the seals 68 and 88 are overmoulded on the front part 66A of the shutter 66 in cavities C68 and C88 defined between parts 66A, 202 and 204, respectively, for cavity C68, and between parts 66A, 202 and 203, for cavity C88.

When the male and female elements 4 and 6 are coupled, they are gradually brought together by moving the connecting plate 10 towards the connecting plate 8 in the direction of arrow F10, successively from the uncoupled configuration shown in FIG. 1 into the three configurations shown in FIG. 3.

During the coupling movement, a guide cone provided at the front distal end 624 of the female tubular body 62 allows the axis X4 to be aligned with the insertion axis X2, if the male tubular body 42 moves within the bore 14. The guide surfaces S624A and S624B help to ensure that the axes X4 and X6 are correctly aligned with the axis X2 during coupling.

In the guiding and contacting configuration shown in the upper part of FIG. 3, the respective front faces 462 and 642 of the shutter 46 and head 644 have been brought into contact. The front faces 462 and 642 are flat and brought into plane-to-plane contact. The mouths 428 and 628 of the two coupling elements are closed by the shutter 46 and the spool 66 respectively.

In this configuration, when the shutter 46 makes contact with the plunger 64, air can be expelled from the contacting front faces 462 and 642, so as to limit the occurrence of air bubbles in the fluid stream at the connection, which is important in an airless application. This configuration precedes the sealing engagement configuration.

In the sealing engagement configuration shown in the middle part of FIG. 3, the respective front surfaces S48 and S68 of the seals 48 and 68 are in contact with each other parallel to the insertion axis X2, this being obtained by means of the shutter 46 retracting into the male tubular body 42, under the action of the head 644 of the plunger 64 which pushes the shutter 46 from its advanced position to its retracted position against the force exerted by the resilient member 49. In other words, the first S48 and second S68 front surfaces of the first 48 and second 68 seals are adapted to contact each other when the male and female elements of the quick coupling 2 are pushed together. From this configuration, the shutter has left its seat formed by the split ring 50 and moves back into the cavity formed by volume V42.

The front sealing engagement of the first and second front surfaces S48 and S68 makes up in a way for the loss of sealing of the radial surfaces 486 and 686 of the seals 48 and 68 respectively on the shutter 46 and the plunger 64.

In this configuration, following contact of the front surfaces S48 and S68, the seals 48 and 68 define an annular sealing section around the insertion axis X2. These seals 48 and 68 deform mainly in compression, plane on plane, for sealing.

In the phase following sealing, between the positions shown in the middle and lower part of FIG. 3 respectively, the peripheral cylindrical wall S644 of the head of the plunger 64 advances into the sealing section formed by the two seals, penetrating into the interior of the seal 48, while contact between the front faces 462 and 642 is maintained.

Continuing the fitting motion in the direction of arrow F10, the coupled configuration shown in the lower part of FIG. 3 is achieved, where the shutter 46 is moved away from the ring 50 and the mouth 428, while the spool 66 is itself moved away from the seat surface 625 and the mouth 628. The front surfaces S48 and S68 of the seals 48 and 68 remain in contact with each other. The fluid from pipe 12 then flows towards pipe 16 through the quick coupling 2, passing from the longitudinal cavity formed by volume V42 to the longitudinal cavity formed by volume V62 within the annular volume delimited by seals 48 and 68 axially abutting each other, as represented by the flow arrows E.

Due to the abutment of the front surfaces S48 and S68 against each other, the edge planes P4 and P6 remain at a distance from each other, both in the sealing engagement configuration and in the coupled configuration. The distance measured in these positions between planes P4 and P6, parallel to the insertion axis X2, is denoted d46. Thus, the distal end 424 of the male tubular body 42 and the front face 662 of the spool 66 are separated by distance d46. This distance d46 is non-zero and has, in the example, a value between 0.2 and 0.4 mm.

In the coupling configuration, the fluid flow between volumes V42 and V62 is optimised. In particular, this fluid circulates in the annular volume delimited by the seals 48 and 68 around the plunger 64 rod, through the distal mouths 428 and 628 which are radially surrounded by the internal radial surfaces S486 and S686 of the seals 48 and 68, the front surfaces S48 and S68 of which are in axial contact, parallel to the insertion axis X2.

During uncoupling, which results from the connection plates 8 and 10 moving apart, due to a movement of the connection plate 10 in the opposite direction to the arrow F10, the plunger 64 and then the shutter 46 each resume cylinder/cylinder contact with the seals 48 and 68, so that the front faces 462 and 642 return to fit into the ring formed by the first and second seals 48 and 68. The bulge 486 of seal 48 and the inner walls S486 and S686 of seals 48 and 68 form a sealing barrier that prevents fluid retention on the outer cylindrical walls S46B and S644 of the shutter and plunger. Thus, and advantageously, this phase of return of the elements 644 and 42 into the internal volume defined by the seals 48 and 68 has the effect of cleaning the external cylindrical walls of the shutter 46 and the head 644 of the plunger 64, before the front surfaces S48 and S68 of the seals are separated from each other and the shutter 46 comes to rest again on its seat formed by the split ring 50. In particular, the cylindrical and external walls S46B of the shutter and S644 of the plunger are free of any drops of the fluid that has passed between the longitudinal cavities V42 and V62, in the coupled configuration of the quick coupling 2.

In the final phase of uncoupling, the distal end 424 of the male tubular body 42 is removed from the volume formed between the bearing surfaces S624A and S624B and the connection plates 8 and 10 are moved away from each other, until they return to the uncoupled configuration of FIG. 1.

During the various connection and disconnection phases and in all configurations shown in FIGS. 1 and 3, the outer seal 88 fitted to the spool 66 seals the movable spool 66 with the female tubular body 62, remaining in contact with the surface S62.

In the uncoupled configuration and in the connection and disconnection phases, the pressure of the fluid in the volumes V42 and V62 is exerted on the rear surfaces S'48 and S'68 of the seals 48 and 68, i.e. in the grooves 488 and 688, thus radially compressing the seals 48 and 68 against the external peripheral surfaces S46B of the shutter 46 and S644 of the plunger head 644. This is due in particular to the concave shape of the surfaces S'48 and S'68, which allows elastic bending of the bulges 486 and 686 radially with respect to the axes X4 and X6.

Figure 5:
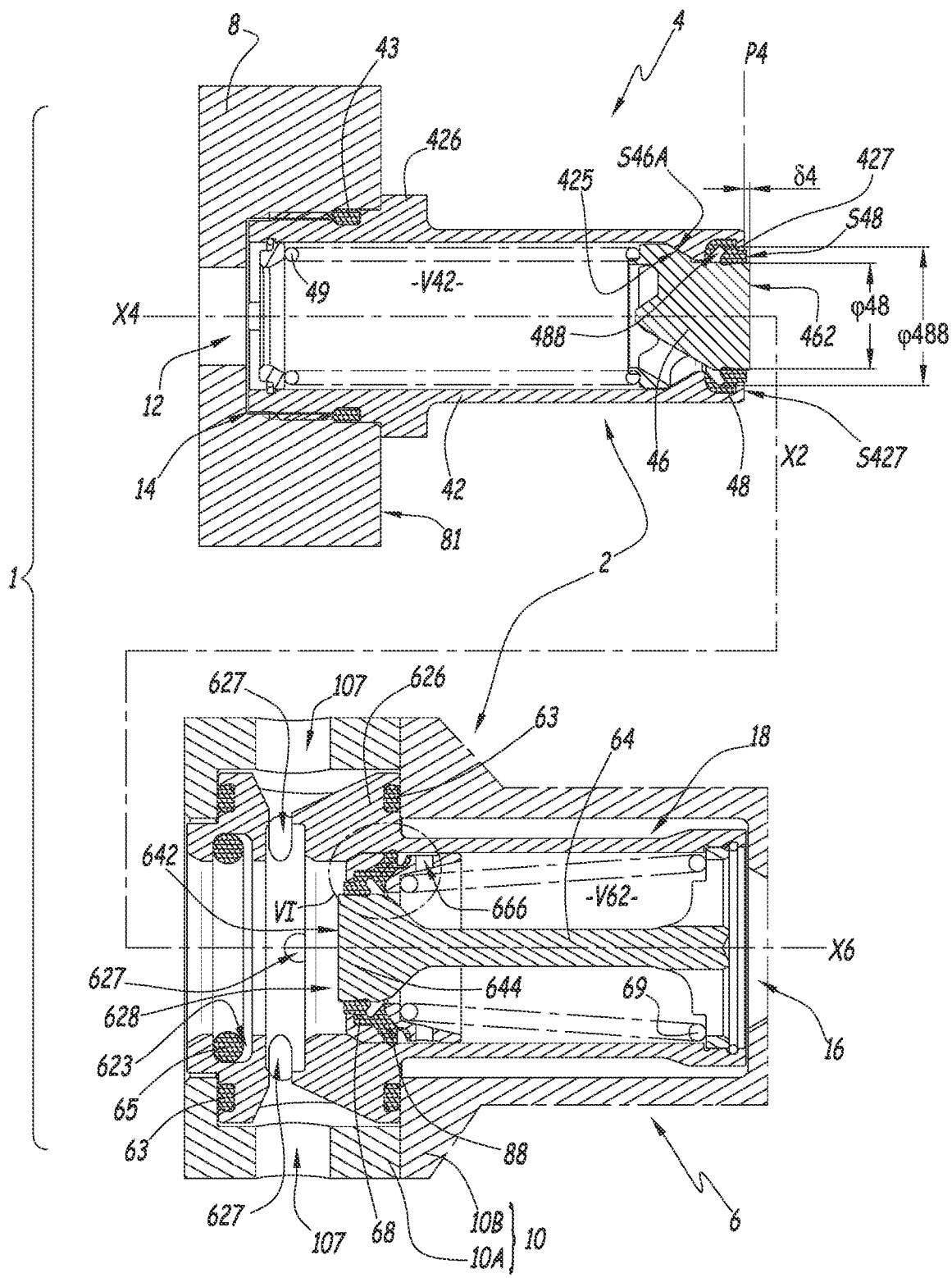
FIG. 5 is a view similar to FIG. 1 for a connection assembly and quick coupling according to a second embodiment.

In the second and third embodiments of the invention shown in FIG. 5 et seq., the elements similar to those of the first embodiment have the same references. In the following, the main differences between these and the first embodiment are described.

In the following, if a reference is used in any of FIG. 5 et seq. without being mentioned in the description, it refers to the same element as the one bearing that reference in the first embodiment. Similarly, if a reference is used in the description without being repeated in FIG. 5 et seq., it refers to the same object as the one bearing the same reference in the first embodiment.

Figure 6:
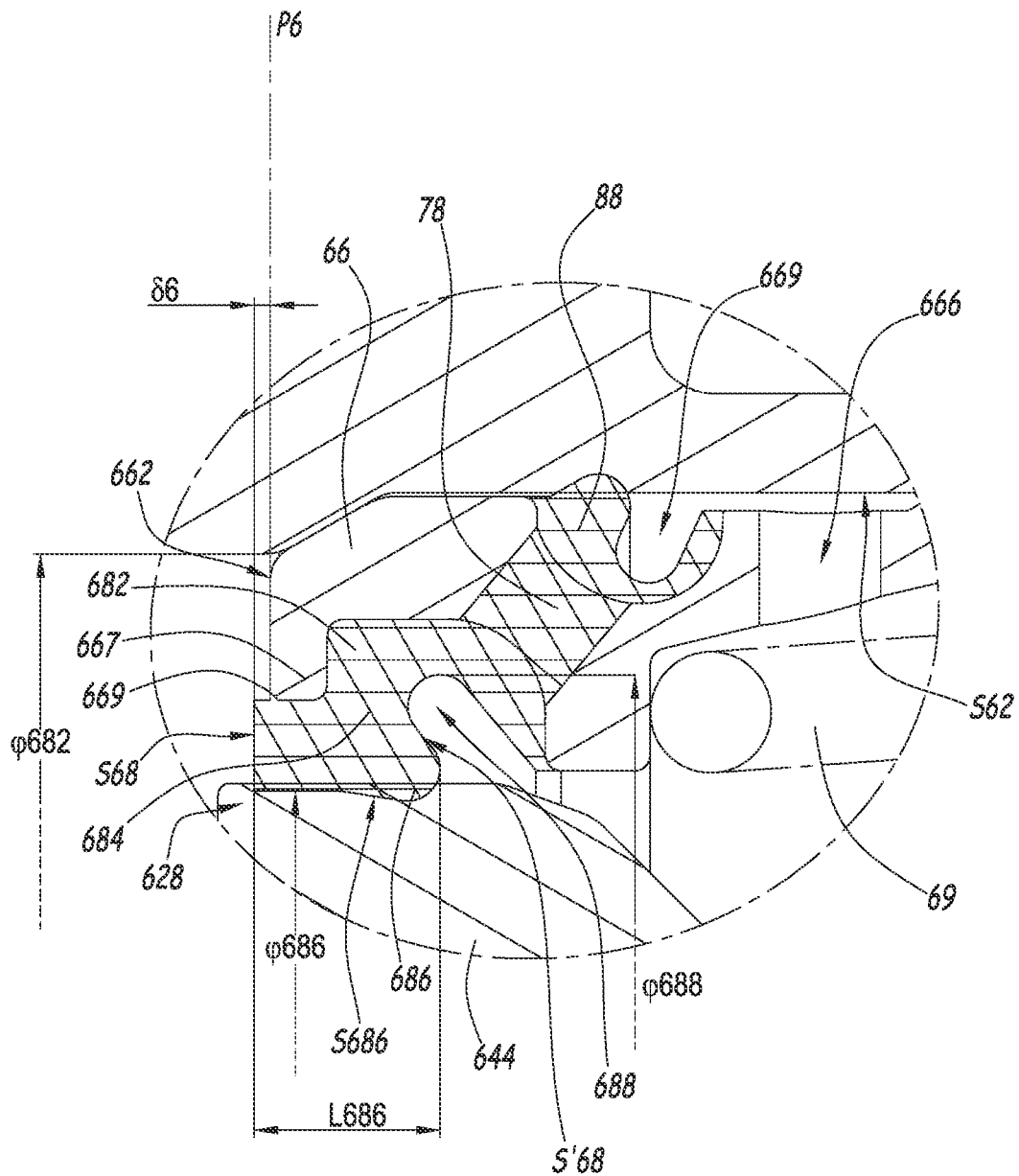
FIG. 6 is an enlarged view of the detail VI in FIG. 5.
Figure 7:
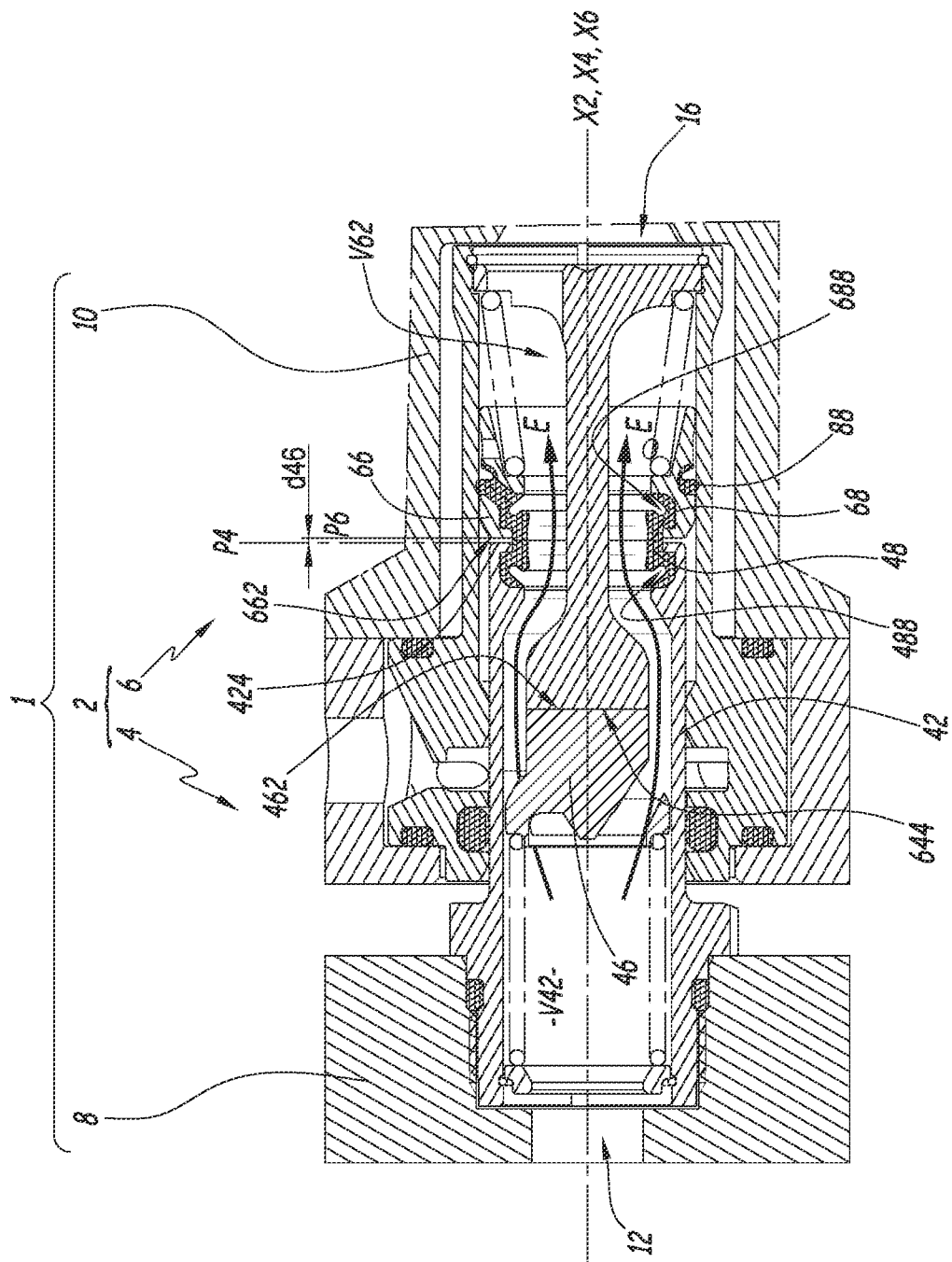
FIG. 7 is a view similar to FIG. 5 in the coupled configuration of the quick coupling in FIGS. 5 and 6.

In the second embodiment shown in FIGS. 5 to 7, the male element 4 of the quick coupling 2 is fixedly mounted in the connection plate 8 by means of an external thread and an internal thread provided respectively on the outside of the tubular male body 42 and in the bore 14, into which the pipe 12 opens. A seal 43 is interposed between parts 4 and 8 and a flange 426 on the outside of the male tubular body 42 abuts a front face 81 of the connecting plate 8.

The front part of the male element, in particular the distal end 424 of the male tubular body 42, is similar to that of the first embodiment and comprises a shutter 46, a seal 48 whose front surface S48 is arranged in front of an edge plane P4 defined as in the first embodiment, along a longitudinal axis X4 of the male element 4.

Unlike the first embodiment, no split ring is provided and the frustoconical surface S46A of the shutter 46 abuts a corresponding frustoconical surface 425 on the inside of the distal end 424 when the shutter 46 closes the distal mouth 428.

The seal 48 differs from that of the first embodiment in that its rear surface S'48 has a more pronounced concavity.

The female element 6 is mounted on the connection plate 10 with the ability to move in a plane radial to its longitudinal axis X6, within the bore 18. The connection plate 10 is bipartite and comprises a front plate portion 10A and a rear plate portion 10B which are assembled, by means not shown, so as to accommodate both a rear portion of the female tubular body 62 and a front portion thereof which has a diameter greater than that of the rear portion by virtue of the existence of a flange 626 in which two holes 627 are provided which form passages for air to clean any droplets formed at the interface between the male and female elements 4 and 6. The holes 627 are aligned with holes 107 in the front part of the plate 10A, which are themselves selectively supplied with pressurised air as required, as explained below, by an air source and valves not shown.

The geometry of the bore 18 and the body 62 allows the axis X6 to be aligned with the insertion axis X2, which in this embodiment is coincident with the axis X4. The front plate portion 10A forms a clamp for retaining the female element 6 on the rear plate portion 10B, the means of joining the front 10A and rear 10B portions being not shown.

The flange 626 of the female element 6 is equipped with two seals 63 mounted on its front and rear faces and bearing respectively against two flat faces of the portions 10A and 10B of the connection plate. The seals 63 provide a seal between the passages 107 and 627 and the portion of the bore 18 between these holes and the rest of the bore 18.

An 0-ring 65 is housed in an inner peripheral groove 623 of the female tubular body 62 and is intended to contact the outer peripheral surface of the male tubular body 42, forward of the flange 426.

The female element 6 comprises two seals 68 and 88 respectively comparable to the seals 68 and 88 of the first embodiment and performing the same functions. In particular, the front surface S68 of the seal 68 is located in front of an edge plane P6 defined as in the first embodiment, opposite a spool 66 for closing a distal mouth 628 of the female element 6.

In this embodiment, the second seal 68 and the third seal 88 are integral with each other. Thus, the seals 68 and 88 are made in one piece by being connected by four oblique holes in the shutter 66, two of which are located in the plane of FIGS. 5 and 6 and in the plane of the upper part of FIG. 7 but not in the plane of the lower part of FIG. 7. These holes correspond to the shaded area marked 78 in FIG. 6.

In comparison to the first embodiment, these holes can be seen as connecting the groove 663 to the volume V66.

Another difference with respect to the first embodiment concerns the fact that the spool is here in one piece, so that the resilient biasing member 69 comes to bear directly against the part of the shutter on which the seals 68 and 88 are overmoulded.

The manufacture of the seals 68 and 88 comprises a machining step complementary to those of the first embodiment and consisting of producing, after the overmoulding of the seal 68, a groove 688 on the rear of this seal 68, which gives the rear surface concavity S'68 a more pronounced character than in the first embodiment, as is clearly visible in FIG. 6.

Similarly, the rear surface S'48 of the seal 48 is provided with a machined groove 488, giving it a more pronounced concavity.

Grooves 488 and 688 are made by turning, using an angled tool. This method of obtaining the concavity of the surfaces S'48 and S'68 is of interest when the overmoulding processes do not allow the use of a counter-form to produce the concave rear surfaces S'48 and S'68, in particular when the diameters of the grooves 488 and 688 are greater than the internal diameters of the seals, as envisaged below.

These grooves 488 and 688 give the seals 48 and 68 good flexibility to adapt easily to the geometry of the mouth 428 or 628 into which they enter. The pressure in grooves 488 and 688 has the effect of holding surfaces S48 and S68 together and strengthening the sealing barrier with the outside in a coupled configuration.

The maximum diameter of the groove 488 is denoted 9488 and the maximum diameter of the groove 688 is denoted 9688. The diameters 9488 and 9688 are equal to the maximum diameters of the surfaces S'48 and S'68 respectively. The diameter 9488 is larger than the diameter 9486, while the diameter 9688 is larger than the diameter 9686. In addition, the diameter 942 is larger than the diameter 9488, thus the maximum diameter of the surface S'48.

On the other hand, four radial holes 666 are provided in the spool 666 and allow a pressure balance between the internal volume V62 of the female tubular body 62 and a groove 669 provided in the rear and external part of the seal 88.

This groove 669 can be made in the same way as groove 668 or in another way.

The respective front surfaces S48 and S68 of the seals 48 and 68 are each further advanced than an edge plane P4 or P6 defined as in the first embodiment. Axial offsets 64 and 66 defined as in the first embodiment each have a non-zero value.

In the example of the figures, the outer diameter 0644 of the head 644 is 0.4 mm and the maximum inner diameter [686 of the seal 68 defined by its surface S686 has a variable value between a maximum value of 9.1 mm and a minimum value of 8.9 mm, the minimum value being present at the bulge 686. The inner wall S686 of the seal 68 has a length L686 parallel to the axis X6 equal to 2 mm, while the front wall S68 is 1 mm thick.

The operation of the second embodiment is comparable to that of the first embodiment, except that air may be injected into ports 107 and 627, before the front surfaces S48 and S68 of seals 48 and 68 come into contact. This allows the front faces 462 and 642 and the front surfaces S48 and S68 to be cleaned of any contamination that may be present before the quick coupling is coupled.

In the coupled configuration of the quick coupling shown in FIG. 7, fluid from pipe 12 flows towards pipe 16 through the quick coupling 2, as represented by the flow arrows E, while the planes P4 and P6, i.e. the distal end 424 of the male tubular body 42 and the front face 662 of the spool 66, are separated by a non-zero distance d46.

Furthermore, due to the presence of the groove 688 which is more pronounced in shape than the grooves of the first embodiment, the effect of fluid pressure on the rear surfaces S'48 and S'68 of the seals 48 and 68 is increased compared to the first mode in the uncoupled configuration. The pressure in grooves 488 and 688 has the effect of holding surfaces S48 and S68 together and strengthening the sealing barrier with the outside in a coupled configuration.

Figure 8:
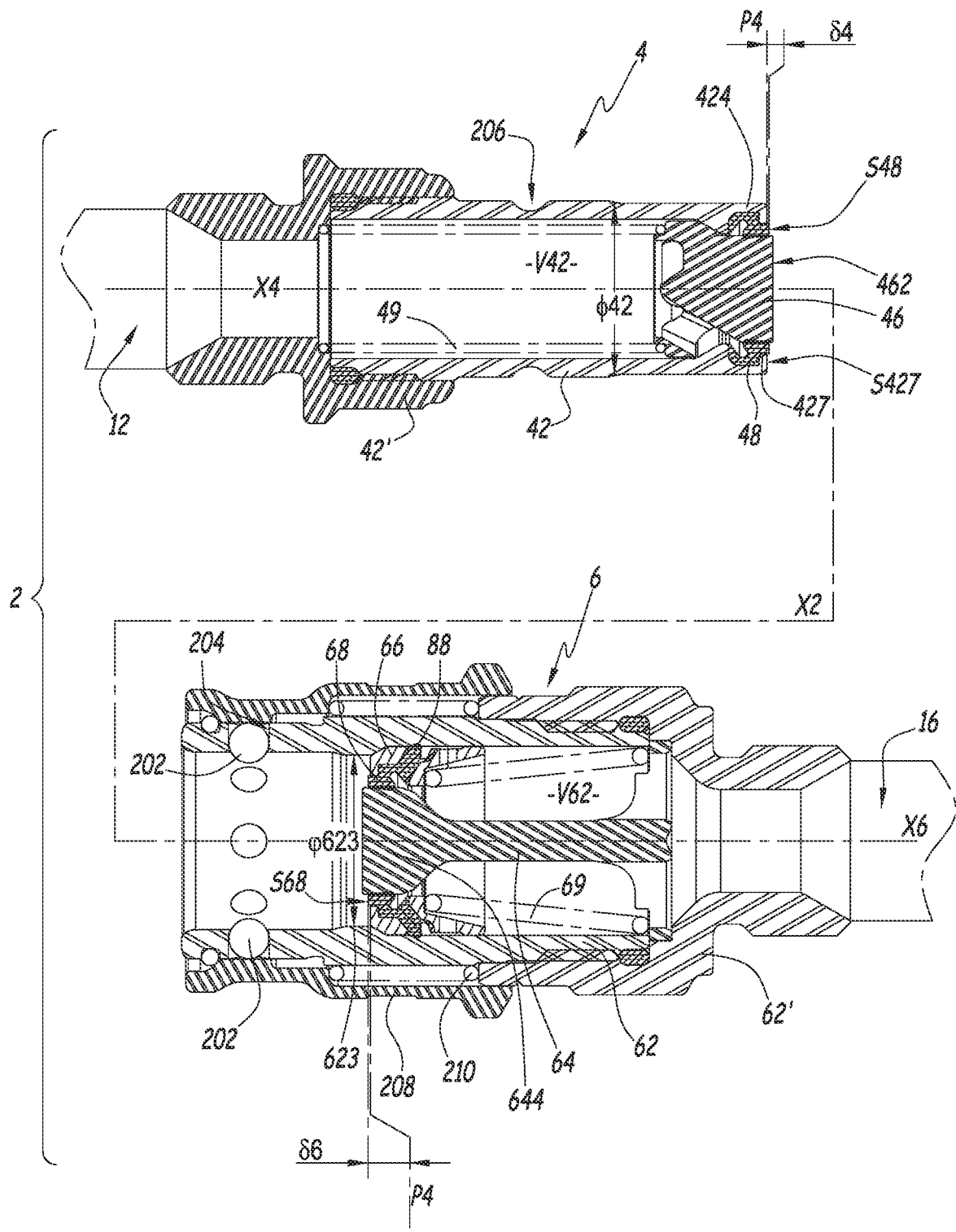
FIG. 8 is a view similar to FIG. 1 for a quick coupling according to a third embodiment of the invention.

In the third embodiment of FIGS. 8 and 9, the elements 4 and 6 of the quick coupling 2 are not mounted on connection plates but each comprise a rear body 42', respectively 62', screwed onto the male or female tubular body 42 or 62 and adapted to fit directly onto a flexible or rigid conduit forming a pipe 12 or 16, by means of clamps not shown.

The two seals 48 and 68 are identical to those of the second embodiment, as is the internal structure of the male and female elements 4 and 6, in particular with regard to the shutter 46, the spool 44 and the plunger 64.

In particular, the respective front surfaces S48 and S68 of the seals 48 and 68 are each further advanced than an edge plane P4 or P6 defined as in the first embodiment. Axial offsets Z4 and Z6 defined as in the first embodiment each have a non-zero value.

In the absence of a connection plate, means are provided for locking the male and female elements in the coupled configuration of the quick coupling. These locking means comprise locking balls 202 housed in radial spaces 204 of the female tubular body 62, while the male tubular body 42 is provided with an external peripheral groove 206 for partially receiving these locking balls, in the coupled configuration of the quick coupling 2. The locking balls 202 are controlled by means of an outer ring 208 mounted movably around the female tubular body 62 along the longitudinal axis X6. When coupling or uncoupling the male and female elements 4 and 6, the locking ring 208 must be operated, against a spring force exerted by a spring 210, in order to allow a centripetal radial movement of limited amplitude of the balls 202 in the radial spaces 204.

The radially outer surface of the male tubular body 42 in the vicinity of its distal end 424 has a diameter 042 equal to the inner diameter 9623 of an inner flange 623 of the female tubular body 62. Thus, the front part of the male tubular body 42 can be guided inside the female tubular body 62, before its shutter 46 comes into contact with the head 644 of the plunger 64, during the fitting movement of the male and female elements 4 and 6 into each other, at coupling, or after the shutter has left the head 644 at uncoupling.

In the third embodiment, the axial movements of the male and female elements 4 and 6 are exerted by acting directly on their respective bodies or on the rear parts 42' and 62'. In other respects, the operation is the same as in the first embodiment.

In either embodiment, the invention provides a quick-connect solution that limits, if not completely eliminates, the risk of dripping as there is no gap between the radial outer walls S46B of the shutter and S644 of the plunger head when their front faces 462 and 642 are in contact, thus avoiding the creation of a fluid retention zone. The invention is also notable in that it uses a limited number of shutter seals, apart from the seals 48, 68 and 88. This is significant in terms of cost price and complexity of manufacture and maintenance.

The sealing between the seals 48 and 68 during the connection and disconnection of the quick coupling 2, i.e. during the coupling and uncoupling of the elements 4 and 6, avoids the risk of dripping during these operations, as well as the inclusion of air in the fluid stream during the connection.

In addition, because the seals 48 and 68 have identical or similar geometries, they can be made, in at least some cases, from the same moulding and/or machining tools.

According to a variant of the invention not shown, the seal 48 and/or 68 is devoid of bulges 486 and 686. In other words, their internal surface 486 and/or 686 is cylindrical with a straight generatrix.

Other geometries are also possible for these seals.

The seals 48 and 68 can be obtained by moulding, overmoulding, machining or any other method available to the person skilled in the art, and have seal wall shapes adapted to those of the parts with which they interact.

The value of the distances d4 and d6 can be adapted according to the other dimensions of the male and female elements of the coupling. For example, for an application requiring a connecting element with a diameter 942 of 20 m and a connecting element with a diameter 9624 of 20 mm, the values of d4 and d6 will be adapted between (and 3 mm, preferably 1.5 mm.

The retaining of the coupling elements in the coupled configuration, as well as their movement between the uncoupled and coupled configurations, can be achieved by means other than the aforementioned connecting plates 8 and 10 and the ball lock 202.

The seals 48 and 68 may be made of any material compatible with their function and with contact with the fluid passing through the quick coupling 2, in particular elastomer, as contemplated above, silicone or polytetrafluoroethylene.

The above-mentioned embodiments and variants can be combined to generate new embodiments of the invention.

The invention claimed is:

1. A quick coupling for a detachable connection of two pipes through which a pressurised fluid flows,
the quick coupling comprising a male element and a female element capable of fitting together along an insertion axis, between an uncoupled configuration and a coupled configuration of the quick coupling,
the male element comprising
a male tubular body which extends along a first longitudinal axis between a proximal end and a distal end and which has
a first longitudinal cavity for passage of pressurised fluid in the coupled configuration of the quick coupling,
a first edge plane formed on an outside of the distal end of the male tubular body and perpendicular to the first longitudinal axis;
a first distal mouth defined by the distal end of the male tubular body and having a diameter smaller than a diameter of the first longitudinal cavity;
a shutter that is movable along the first longitudinal axis between an advanced position, where it closes the first distal mouth, and a retracted position, where it does not close the first distal mouth;
a first seal;
the female element comprising
a female tubular body which extends along a second longitudinal axis between a proximal end and a distal end and which comprises
a second longitudinal cavity for the passage of pressurised fluid in the coupled configuration of the quick coupling,
a second distal mouth, a diameter of which is smaller than a diameter of the second longitudinal cavity;
a plunger capable of pushing the movable shutter from its advanced position to its retracted position along the first longitudinal axis;
a spool
mounted around the plunger,
movable along the second longitudinal axis between an advanced position, where it closes the second distal mouth, and a retracted position, where it does not close the second distal mouth, and
which has a second edge plane, formed on an outside of a distal end of the spool and perpendicular to the second longitudinal axis;
a second seal which is partially housed in a groove in the spool and which rests on a wall of the plunger when the spool is in the advanced position,
wherein
the first seal is partially housed in a groove in the male tubular body and rests on a cylindrical surface of the movable shutter, in a direction radial to the first longitudinal axis, when this movable shutter is in the advanced position;
when the spool is in the advanced position, the second seal rests on a cylindrical wall of the plunger in a direction radial to the second longitudinal axis;
the first seal comprises a first front surface which is more advanced than the first edge plane along the first longitudinal axis;
the second seal comprises a second front surface which is more advanced than the second edge plane along the second longitudinal axis; and
the first and second front surfaces of the first and second seals are adapted to contact each other when the male and female elements of the quick coupling are fitted together.

2. The quick coupling according to claim 1, wherein
when the shutter is in the advanced position, the first seal occupies an annular volume defined, radially to the first longitudinal axis, between the male tubular body and the shutter and, axially along the first longitudinal axis, in front of the groove of the male tubular body and to a rear of the first edge plane and/or
when the spool is in the advanced position, the second seal occupies an annular volume defined, radially to the second longitudinal axis, between the plunger and the distal end of the spool and, axially along the second longitudinal axis, in front of the groove of the spool and behind the second edge plane.

3. The quick coupling according to claim 1, wherein
the shutter has a front face facing away from the first cavity and arranged axially along the first longitudinal axis in front of the first front surface in the advanced position of the shutter and/or
the plunger has a front face facing away from the second cavity and arranged axially along the second longitudinal axis in front of the second front surface in the advanced position of the plunger.

4. The quick coupling according to claim 3, characterised in that
when the shutter is in the advanced position, the first front surface is located, along the first longitudinal axis, between the first edge plane and a first plane parallel to the first edge plane, perpendicular to the first longitudinal axis and passing through the front face of the shutter, and
when the shutter is in the advanced position, the first edge plane and the first parallel plane are separated by a distance less than or equal to 1 mm along this axis and/or
when the spool is in the advanced position, the second front surface is located, along the second longitudinal axis, between the second edge plane and a second plane parallel to the first edge plane, perpendicular to the second longitudinal axis and passing through the front face of the plunger, and
when the spool is in the advanced position, the second edge plane and the second parallel plane are separated by a distance less than or equal to 1 mm along this axis.

5. The quick coupling according to claim 3, wherein, in the coupled configuration of the quick coupling,
the plunger holds the shutter in the retracted position;
the pressurised fluid is free to flow between the first and second longitudinal cavities; and
the distal end of the male tubular body and a front face of the spool are spaced apart along the insertion axis by a non-zero distance.

6. The quick coupling according to claim 1, wherein
the first seal comprises
a first locking bead for hooking in the groove of the male tubular body, this first bead being delimited by a first surface of contact with the groove of the male tubular body,
a first internal surface designed to rest against the cylindrical wall of the shutter and
a bulge whose unstressed diameter is smaller than an outer diameter of the shutter and which is bounded by the first inner surface; and/or
the second seal comprises a second locking bead for hooking in the groove of the spool, this second bead being delimited by a second surface in contact with this groove of the spool, a second internal surface designed to rest against the cylindrical wall of the plunger and a bulge whose unstressed diameter is smaller than an outer diameter of the plunger and which is bounded by the second inner surface.

7. The quick coupling according to claim 6, wherein the first seal comprises a first rear surface which faces the first longitudinal cavity connects a first contact surface with the first internal surface and is concave in shape and/or the second seal comprises a second rear surface which faces the second longitudinal cavity connects a second contact surface with the second internal surface and is concave in shape.

8. The quick coupling according to claim 7, wherein the first rear surface delimits a first groove which is open to the first longitudinal cavity in the advanced position of the shutter and whose maximum diameter is greater than a minimum diameter of the first contact surface and/or the second rear surface delimits a second groove which is open to the second longitudinal cavity in the advanced position of the shutter and whose maximum diameter is greater than a minimum diameter of the second contact surface.

9. The quick coupling according to claim 7, wherein, behind the groove, the male tubular body has an internal diameter greater than a maximum diameter of the first rear surface.

10. The quick coupling according to claim 9, wherein the male element comprises a ring fitted into the male tubular body;

configured to form a seat for supporting the shutter in the advanced position and whose inner diameter is smaller than a maximum diameter of the first rear surface.

11. The quick coupling according to claim 1, wherein the male element comprises a first resilient biasing member configured to bias the shutter into the advanced position and the female element comprises a second resilient biasing member configured to bias the spool into the advanced position.

12. The quick coupling according to claim 11, wherein at the spool is formed of a front part, which comprises the groove where the second seal is partially housed, and of a rear part attached to the front part, which comprises a proximal bearing surface for the second resilient biasing member and an internal diameter of which is smaller than a minimum diameter of a second contact surface.

13. The quick coupling according to claim 1, wherein the spool carries a third seal in contact with the female tubular body in the advanced and retracted positions of the spool.

14. The quick coupling according to claim 1, wherein, in the coupled configuration of the quick coupling, the first front surface is in axial contact, parallel to the insertion axis, with the second front surface.

15. The quick coupling according to claim 1, wherein the first seal and the second seal are identical.

16. The quick coupling according claim 1, wherein the female element comprises at least two bearing surfaces centred on the second longitudinal axis;

the bearing surfaces are configured to guide the male element during insertion; and the bearing surfaces have a common guide diameter and are offset along the second longitudinal axis by a distance greater than or equal to one-fifth of the common guide diameter.

17. An assembly for connecting a mobile connection plate to at least one fixed connection plate, wherein the connection assembly comprises at least one quick coupling according to claim 1;

the male element of the quick coupling and the female element of the quick coupling are each mounted on one of the movable and fixed plates, which has a pipe running through it that is fluidly connected to the first or second longitudinal cavity of the coupling element; and a first plate, of the movable plate and the fixed plate, is equipped with a clamp for retaining the male or female element mounted on this first plate, this retaining clamp allowing a movement of the male or female element with respect to the first plate, in a plane normal to the first or second longitudinal axis of the male or female element mounted on this first plate.

18. The assembly according to claim 17, wherein the assembly is configured for connecting hydraulic circuits.

\* \* \* \* \*